United States Patent [19]

Sakane

[11] Patent Number: 5,001,311
[45] Date of Patent: Mar. 19, 1991

[54] HORN SWITCH MECHANISM OF STEERING WHEEL

[75] Inventor: Katsunobu Sakane, Ichinomiya, Japan

[73] Assignee: Toyoda Gosei Co., Ltd., Nishikasugai, Japan

[21] Appl. No.: 495,905

[22] Filed: Mar. 20, 1990

[30] Foreign Application Priority Data

Mar. 27, 1989 [JP] Japan .............................. 1-034475[U]
Aug. 31, 1989 [JP] Japan .............................. 1-102252[U]

[51] Int. Cl.$^5$ .......................... H01H 9/00; B62D 1/04
[52] U.S. Cl. ................................. 200/61.54; 200/61.55
[58] Field of Search ........................... 200/61.54–61.57

[56] References Cited

U.S. PATENT DOCUMENTS

| | | | |
|---|---|---|---|
| 2,361,630 | 10/1944 | Jacobi | 200/61.57 X |
| 4,374,310 | 2/1983 | Kato et al. | 200/61.54 |
| 4,447,684 | 5/1984 | Sugiyama | 200/61.57 X |
| 4,594,486 | 6/1986 | Noda | 200/61.55 X |
| 4,789,763 | 12/1988 | Nagata et al. | 200/61.54 |
| 4,899,020 | 2/1990 | Ohno et al. | 174/258 |

Primary Examiner—J. R. Scott
Attorney, Agent, or Firm—Cushman, Darby & Cushman

[57] ABSTRACT

A horn switch mechanism of a steering wheel comprises a stationary contact plate having a locking hole, a movable contact plate having a base portion fixed to the stationary contact plate and contact portions extending upward from the base portion, a depressing plate disposed above the movable contact plate, and a horn pad disposed above the depressing plate. The depressing plate is connected to a lead wire electrically connected to the horn control circuit. An electrical insulation clip-like spacer made of synthetic resin having spring elasticity is disposed between the stationary contact plate and the movable contact plate and fastens the latter on the former. The electrical insulation spacer comprises a base member, a slit provided on the base member, and two rotatable locking legs projecting respectively from both sides of the base member with each locking leg having a hook-like engaging portions on the inner and outer ends thereof. Each locking leg is locked to a peripheral edge of the locking holes of the stationary contact plate by the engaging portion on the outer end and the base portion of the movable contact plate is locked to the base member by the engaging portions on the inner ends of the legs.

12 Claims, 9 Drawing Sheets

HORN SWITCH MECHANISM OF STEERING WHEEL

BACKGROUND OF THE INVENTION

1. Field of the Invention

The present invention relates to a horn switch mechanism mounted on a steering wheel of an automobile.

2. Description of the Prior Art

Figure 1:
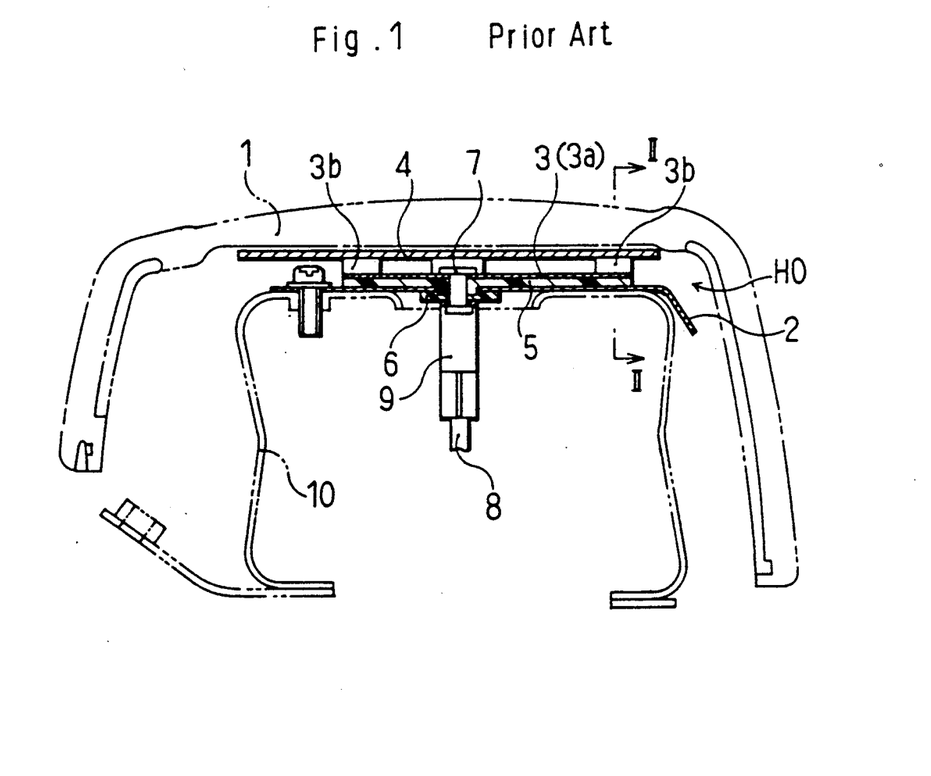
FIG. 1 is a sectional view of a horn switch mechanism in the prior art.
Figure 2:
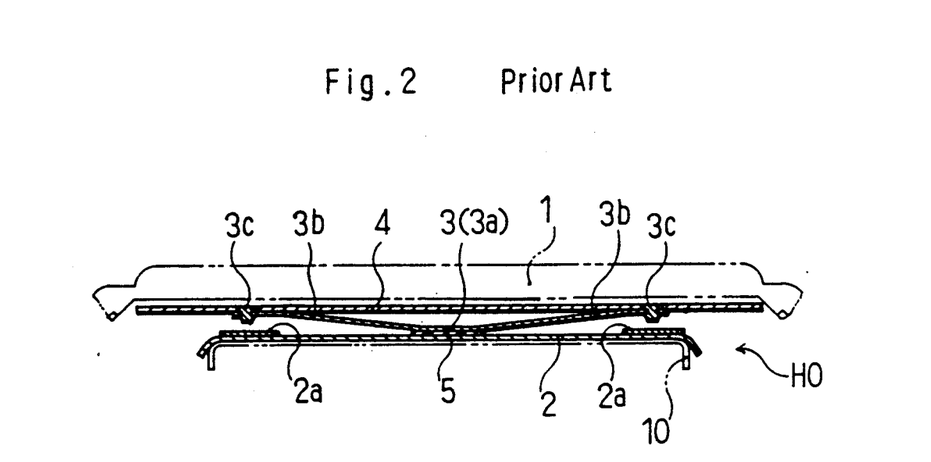
FIG. 2 is a sectional view taken on line II—II of FIG. 1.

A conventional horn switch mechanism of a steering wheel in the prior art is shown in FIGS. 1 and 2 of U.S. Pat. No. 4,594,486.

This conventional horn switch mechanism HO is composed of a stationary contact plate 2 made of sheet metal and a movable contact plate 3 made of a metal plate spring.

The movable contact plate 3 is of H shape viewing from the upper side, and the cross-bar portion of the H shape is made a base portion 3a disposed against the stationary contact plate 2 and the bar or leg portions of the H shape are made contact portions 3b extending upward from the base portion 3a and having contacts 3c on their ends.

On the upper surface of the contact portions 3b of the movable contact plate 3 is arranged a depressing plate 4 which is restricted at the separation distance from the stationary contact plate 2 by a restricting means (not shown) and electrically insulated from the stationary contact plate 2, and further a horn pad 1 is disposed above the depressing plate 4.

The base portion 3a of the movable contact plate 3 is fixed to the stationary contact plate 2 through an electrical insulation plate 5 made of plate-shaped synthetic resin having a peripheral configuration similar to that of the base portion 3a, an electrical insulation ring 6 made of circular ring shaped synthetic resin and a terminal 9 with L-like cross-section by a rivet 7 having conductive property.

The stationary contact plate 2 is secured to an energy absorber 10 made of sheel metal fixed to the steering wheel body, such as a boss (not shown) of the steering wheel, and the stationary contact plate 2 is electrically connected to a negative terminal of a horn control circuit through the energy absorber 10.

On the other hand, the movable contact plate 3 is electrically connected to a positive terminal of the horn control circuit through a lead wire 8 connected to the terminal 9.

In the horn switch mechanism HO, the horn pad 1 is depressed thereby the contact portions 3b of the movable contact plate 3 are depressed through the depressing plate 4 and the contacts 3c of the contact portions 3b are brought into contact with contacts 2a of the stationary contact plate 2 and the horn is operated.

In the conventional horn switch mechanism HO, however, the movable contact plate 3 is locked by the rivet 7 to the stationary contact plate 2 through the electrical insulation plate 5, the electrical insulation ring 6 and the terminal 9 and therefore there are many assemblying parts.

Also at the locking by the rivet 7, since the four parts, i.e., the movable contact plate 3, the electrical insulation plate 5, the electrical insulation ring 6 and the terminal 9, must be arranged to the stationary contact plate 2, care must be taken so that various parts are not shifted and therefore the assemblying work becomes troublesome.

SUMMARY OF THE INVENTION

It is therefore an object of the present invention to provide a horn switch mechanism of a steering wheel wherein the number of the assembling parts can be decreased and the assembling work becomes easy.

The above-described object is achieved by a horn switch mechanism of a steering wheel, which comprises:

a stationary contact plate made of sheet metal and having a locking hole at a predetermined position;

a movable contact plate made of a metal plate spring and having a base portion and contact portions extending upward from the base portion, said base portion being fixed to the upper side of the stationary contact plate near the locking hole but electrically insulated from the stationary contact plate and said contact portions being arranged at a separated state upward from the stationary contact plate;

a depressing plate made of sheet metal and abutting on upper surface of the contact portions of the movable contact plate and restricted at a separated distance from the stationary contact plate and electrically insulated therefrom;

a depressing horn pad disposed above the depressing plate and bringing the contact portions of the movable contact plate into contact with the stationary contact plate through the depressing plate during the depressing operation;

a tongue formed on the depressing plate;

a lead wire connected to the tonogue and electrically connected to the poalrity side corresponding to that of the horn control circuit electrically connected to the stationary contact plate;

an electrically insulation spacer and clip made of synthetic resin having electrical insulation property and spring elasticity and disposed between the stationary contact plate and the base portion of the movable contact plate;

said electrical insulation spacer comprising a base member mounting the base portion of the movable contact plate to said upper side of the stationary contact plate two slits parallel to each other in the vicinity of both sides nearly midway between the ends and two locking legs projecting oppositely outward in symmetry respectively from both sides of the base member adjacent the slits and being bent downward respectively and locked to a peripheral edge of the locking holes in the stationary contact plate; and said locking legs having engaging portions locking the edge side portion of the base portions of the movable contact plate when said legs are bent downward and capable of holding the movable contact plate on the base member.

In the horn switch mechanism according to the invention, during the assembling, the two locking legs projecting from both sides of the base member of the electrically insulation spacer are bent downward, and the edge portion of the base portions of the movable contact plate are locked by the engaging portions of the locking legs. The movable contact plate is held on the base member, and the locking legs are locked to peripheral edges of the locking holes in the stationary contact plate. Therefore, an electrical insulation ring and a rivet in the prior art is not used but only one electrical insulation spacer is used to assemble the movable contact plate to the stationary contact plate.

In the invention, the lead wire connected to the movable contact plate in the prior art may be connected utilizing for example, a riveting connecting terminal to a tongue of the depressing plate. The rivet does not lock together four parts, i.e., the movable contact plate, the electrical insulation plate, the electrical insulation ring and the terminal, as in the prior art, but only two parts, i.e., the tongue and the terminal which connection can be performed easily. The connection to the movable contact plate can be performed without hindrance because the depressing plate is made of sheet metal and abuts the upper surface of the contact portions of the movable contact plate.

Consequently, in the horn switch mechanism of the steering wheel according to the invention, when the movable contact plate is assembled to the stationary contact plate, an electrical insulation ring or a rivet is not used although required in the prior art, but the assembling becomes possible by using only one electrical insulation spacer. Accordingly, the number of the assembling parts can be decreased. Also since two locking legs of the electrical insulation spacer engages the edge portion of the base portion of the movable contact plate and hold the movable contact plate on the base member and also are locked respectively to two portions at the peripheral edge of the two locking holes of the stationary plate, the assembling to the stationary contact plate becomes possible without rotating the movable contact plate or the electrical insulation spacer. Further, since the connecting of the lead wire to the tongue of the depressing plate becomes easy, in cooperation with the decrease of the number of the assembling parts, the assembly work is not troublesome.

DESCRIPTION OF THE PREFERRED EMBODIMENTS

With reference to the accompanying drawings, preferred embodiments fo the present invention are described hereinbelow.

Figure 3:
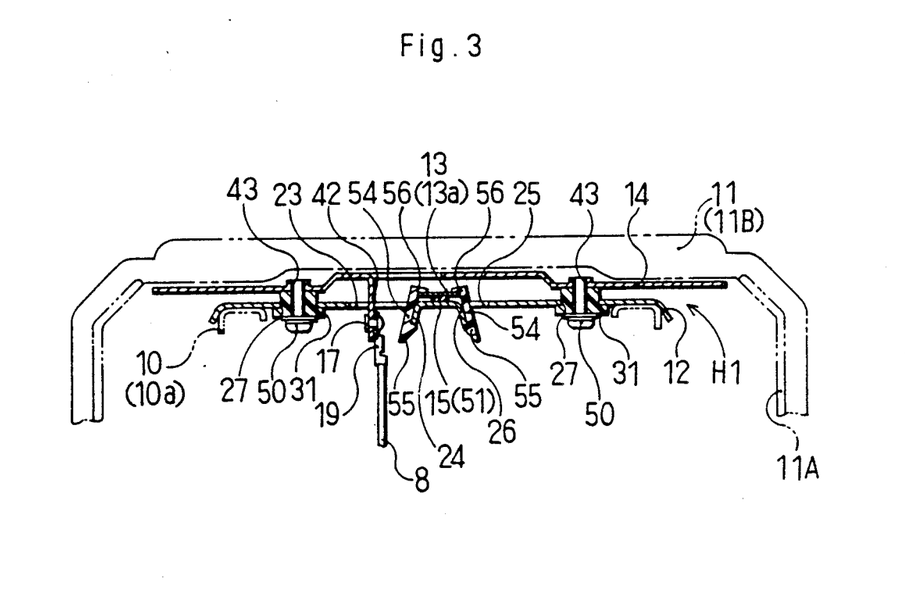
FIG. 3 shows a first embodiment of the invention and is a sectional view taken on line III—III of FIG. 7.
Figure 6:
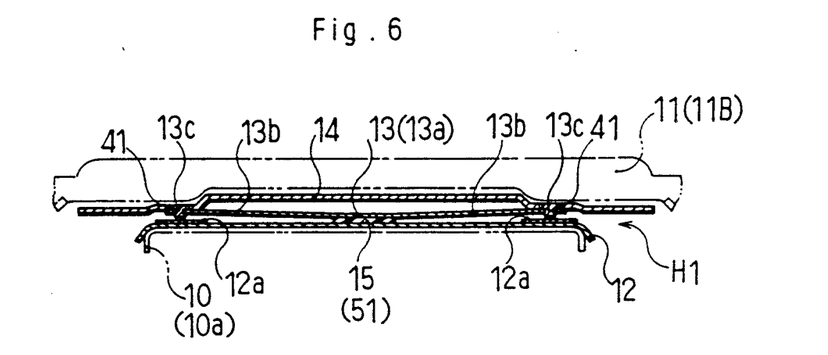
FIG. 6 is a sectional view taken on line VI—VI of FIG. 7.
Figure 7:
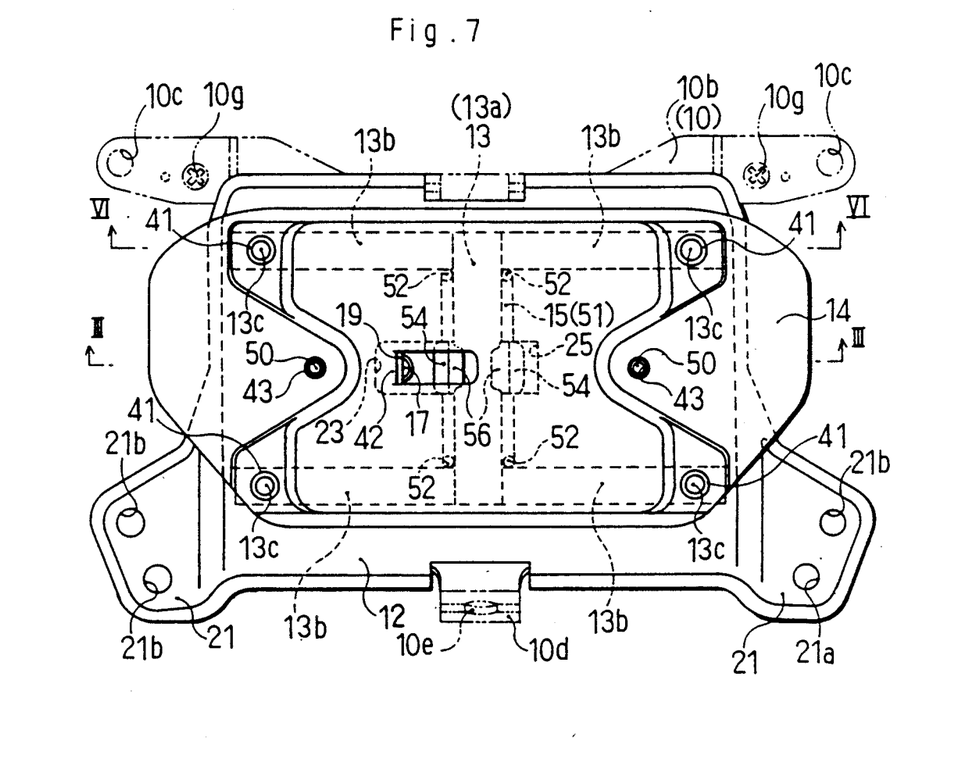
FIG. 7 is a plan view illustrating the assembled state of the movable contact plate, the electrical insulation spacer and the stationary plate of the first embodiment.
Figure 8:
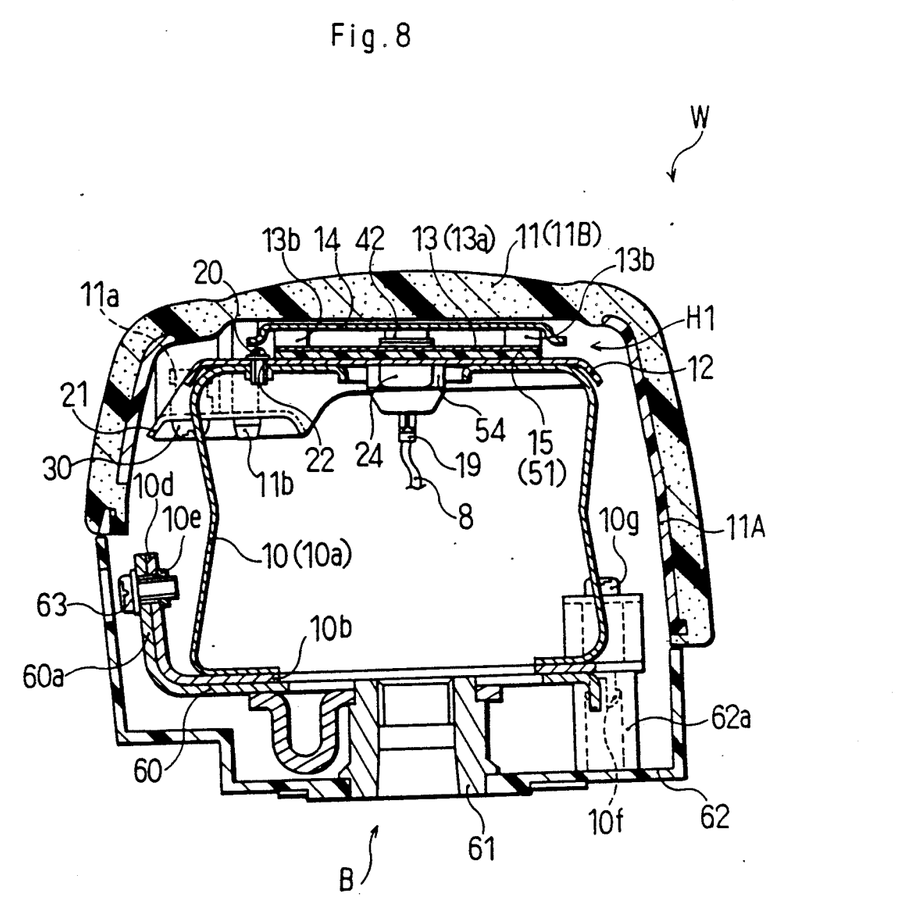
FIG. 8 is a sectional view of the steering wheel, illustrating the assembled state of the first embodiment, taken on line VIII—VIII of FIG. 9.

A horn switch mechanism H1 shown in a first embodiment is constituted in arrangement above an energy absorber 10 as shown in FIGS. 3, 6 and 8. The energy absorber 10 is made of sheet metal, and constituted by a deforming member 10a with cross-section of nearly reverse U-like shape and a plate-shaped base portion 10b of rectangular ring shape fixed below the deforming member 10a as shown in FIG. 8, and to the side 60a of the body of a steering wheel W, such as a boss plate 60 in a boss member B of the steering wheel W. A stationary contact plate 12 is fixed above the deforming member 10a utilizing a screw 20 or welding.

The stationary contact plate 12 is made of sheet metal of nearly rectangular plate shape, and contacts 12a thereof are arranged on the upper side at the four corners thereof as shown in FIGS. 3-9. Projecting members 21 projecting outward are formed in a lowered state by one step on two corners at the rear side of the steering wheel W, and two holes 21a, 21b are formed on each of the projecting members 21. The hole 21a receives a screw 30 threadedly engaged with a nut 11a embedded in a horn pad 11 as hereinafter described, and the hole 21b is a positioning hole for receiving a projection 11b projecting downward from the horn pad 11. On both lateral sides nearly at the center of the stationary contact plate 12 are formed inserting holes 27 for arranging a restricting means 31 as hereinafter described.

Figure 5:
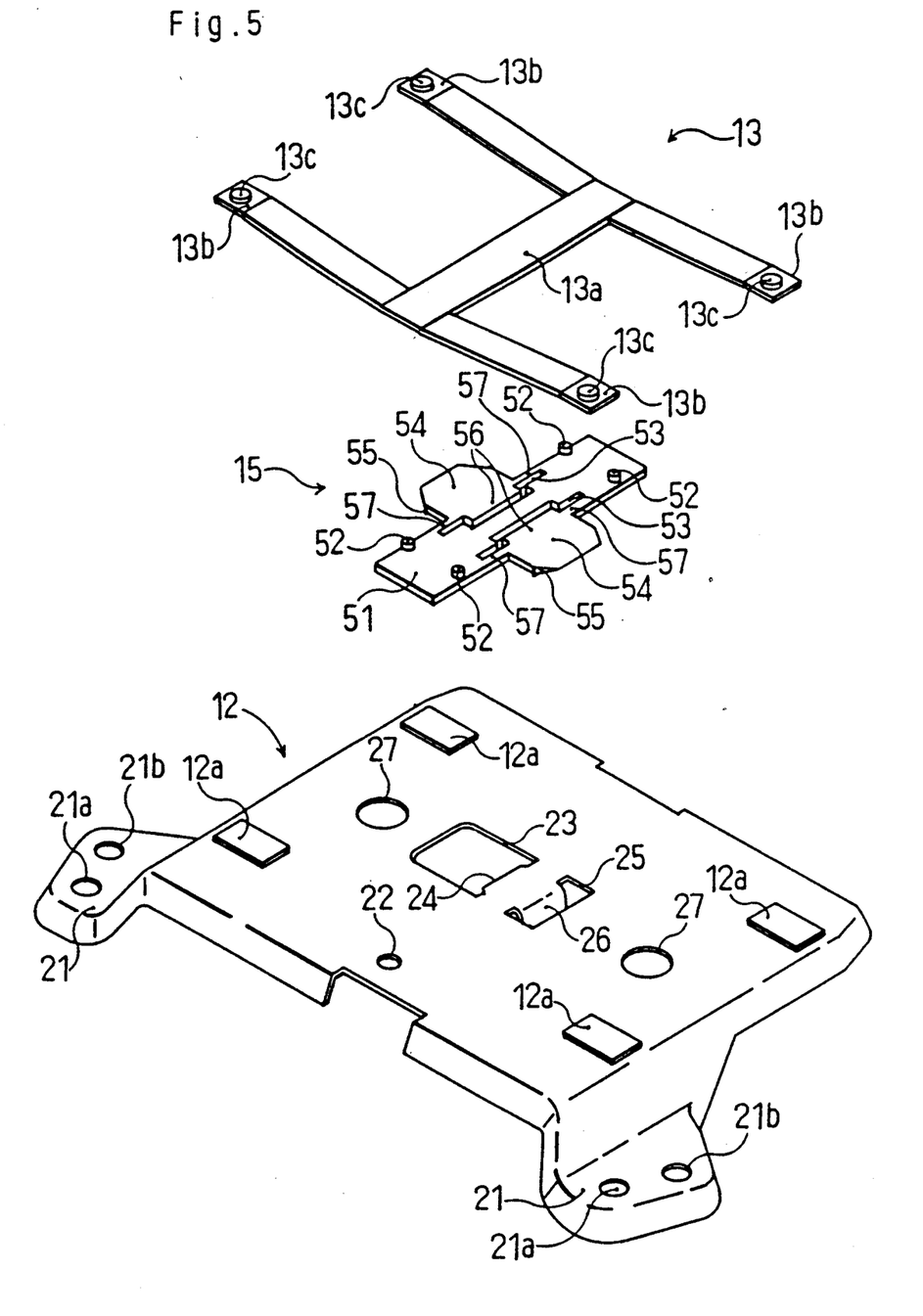
FIG. 5 is an exploded perspective view of the movable contact plate, the electrical insulation spacer and the stationary contact plate of the first embodiment.

On the stationary contact plate 12, two larger and smaller locking holes 23, 25 are formed adjacent to each other at the center portion. These locking holes 23, 25 are formed in arrangement along the minor axis direction of a base portion 13a of a movable contact plate 13 when the movable contact plate 13 is arranged above the stationary contact plate 12. Engaging portions 24, 26 bent downward are formed on peripheral edge portions of these locking holes 23, 25 on opposite sides of the strip separating the holes.

Numeral 22 designates a hole through which extends the screw 20 to fix the stationary contact plate 12 to upper side of the deforming member 10a of the energy absorber 10 (refer to FIGS. 5 and 8).

The movable contact plate 13 arranged above the stationary contact plate 12, as shown in FIGS. 3-8, is made of a metal plate spring H shaped when viewed from the upper side in similar manner to the prior art. The cross bar portion of the H is made a base portion 13a disposed to face the stationary contact plate 12 and the lateral leg portions of the H constitute contact portions 13b extending or inclined upward from the base portion 13a. Contacts 13c, corresponding to the contacts 12a of the stationary contact plate 12, extend both upward and downward on the ends of each contact portions 13b.

An electrical insulation spacer 15 forming a spring clip made of synthetic resin having electrical insulation property and spring elasticity, such as polypropylene, and is arranged between the base portion 13a of the movable contact plate 13 and the stationary contact plate 12 and retains the former on the latter.

The electrical insulation spacer 15 is provided with a base member 51 of nearly rectangular plate shape corresponding to the base portion 13a of the movable contact plate 13. The base member 51 is provided along both longer sides on the upper surface with two pairs of upward extending position-defining projections 52, the projections of each pair being spaced apart a distance corresponding to the width dimension of the base portion 13a (refer to FIGS. 5 and 7). Also the base member 51 is provided in the vicinity fo both sides nearly at the center with slits 53, 53 nearly in parallel to each other along the major axis direction of the base portion 13a. The portion between slits 53, 53 may be removed so as to make a single slit. Further the base member 51 is provided with coplanar lateral locking legs 54, 54 extending oppositely both outward and inward in symmetry from both sides of the base member 51 opposite each slit 53. The slits 53 are configured to define the inner ends of the legs which form hook-like engaging members 56 as hereinafter described and also to define narrow portions 57, 57 connecting the opposite sides of each leg to the base member 51. When each locking leg 54 is bent downward, as later described, the connecting portions 57 are subjected to elastic deformation and twisted easily to enable each locking leg 54 to be bent downward easily.

Figure 4:
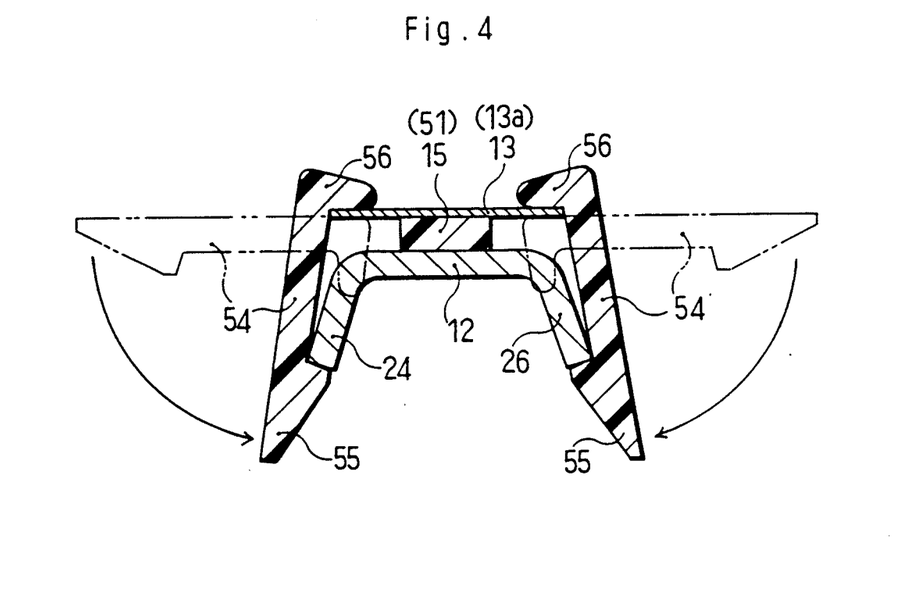
FIG. 4 is a sectional view illustrating the mode of assembling the movable contact plate of the first embodiment to the stationary contact plate.

Each locking leg 54 is provided with a hook-like portion 55 at its outer end, and also provided with the hook-like engaging member 56 at the inner end. The hook-like portion 55 locks each locking leg 54 to a corresponding engaging portion 24, 26 on peripheral edge of the locking holes 23, 25 when each locking leg 54 is bent downward and at the same time the engaging members 56 lock both side edge portions of the base portion 13a onto the base member 51. After each locking leg 54 is bent downward and both side edges of the base portion 13a are locked onto the base member 51 by the hook-like engaging member 56, as shown in FIG. 4, the base portion 13a prevents the spring elasticity of the connecting portions 57 to restore the locking legs 54 to their original state or position coplanar with base member 51, as shown in dot-dash lines in FIG. 4. Thus the locking legs 54 fasten the movable contact plate 13 onto the stationary contact plate 12 while the spacer 15 insulates the plates 12, 13 from each other.

On the upper side of the movable contact plate 13, as shown in FIGS. 3 and 6–9, an elliptical-shaped flexible depressing plate 14 of sheet metal is arranged in abutting relation on the contact portions 13b.

The depressing plate 14 is provided with through holes 41 for receiving the upper contacts 13c of the movable contact plate 13 to properly align the plate 14 on the plate 13. Also the depressing plate 14 is provided with threaded holes 43 aligned with the holes 27 in the plate 12. A flanged spacer or grommet 31 made of synthetic resin having insulation property is locked in each hole 27 in the stationary contact plate 12 and extends upward to abut the plate 14. The plate 14 is fastened on top of the spacers 31 by screws 50 extending through the spacers into the threaded holes 43. The flanged spacers 31 define the separation distance between the stationary contact plate 12 and the depressing plate 14, while serving as means to insulate the depressing plate 14 from the stationary contact plate 12.

Near the center of the depressing plate 14 is a depending tongue 41 which projects downward through the larger locking hole 23 in the stationary contact plate 12. A terminal 19 is fastened to the end of the tongue 42 with a rivet 17. A lead wire 8 electrically connected to the positive polarity side of the horn control circuit (not shown) is connected to the terminal 19 by clampling and the conduction to movable contact plate 13 is performed through the depressing plate 14 which is made of sheet metal. On the other hand, the stationary contact plate 12 after assembling to the steering wheel body is electrically connected to the negative polarity side of the horn control circuit through the energy absorber 10, a boss plate 60, a boss 61 and the like.

Alternatively the base portion 13a of the movable contact plate 13 may be provided with a tongue, like tongue 42, which projects downward through a hole in the stationary contact plate 12.

A depressing horn pad 11 comprising an insert 11A made of semi-hard synthetic resin having shape holding property and a coating layer 118 made of soft synthetic resin is arranged above the depressing plate 14 as shown in FIGS. 3, 6 and 8. In the depressing horn pad 11 are nuts 11a, shown in FIG. 8, embedded at the rear side of the steering wheel W and also at the front side thereof. Screws 30 are threadedly engaged with the nuts 11a at the rear side of the steering wheel through the threaded holes 21a in the projections 21 in the stationary contact plate 12, and also threadedly engaged with nuts (not shown) at the front side of the steering wheel through threaded holes 10c (refer to FIG. 7) formed in the base portion 10b of the energy absorber 10, thereby the depressing horn pad 11 is assembled to the energy absorber 10 fixing the stationary plate 12. Projections 11b depending from the depressing horn pad 11 are inserted in the positioning holes 21b in the projecting members 21 of the stationary contact plate 12 during assembling, and facilitates the positioning work.

If the insert 11A is disposed in an upper portion of the depressing horn pad 11, the depressing plate 14 may be removed so that the depressing horn pad 11 depresses directly on the movable contact plate 13.

Next, assembling of the horn switch mechanism H1 in the first embodiment will be described. First the stationary contact plate 12 is fixed on the deforming member 10a of the energy absorber 10 utilizing the screw 28 or welding, and the terminal 19 with the lead wire 8 is connected to the tongue 42 of the depressing plate 14 by the rivet 17.

As shown in FIG. 4, the base portion 13a of the movable contact plate 13 is arranged on the base member 51 of the electrical insulation spacer 15 and the locking legs 54, 54 are bent downward and extend through the holes 23, 25 in the plate 12. Both side edge portions of the base portion 13a then are engaged by the members 56, 56 of the locking legs 54 and further the locking legs 54, 54 are locked to the locking members 24, 26 on the stationary contact plate 12. Thus, the plate 13 is locked on the plate 12 and electrically insulated therefrom.

The upper contacts 13c of the movable contact plate 13 are disposed in the through holes 41 of the plate 14; the flanged spacers 31 are inserted in the holes 27 in the stationary contact plate 12; and the screws 50 are threadedly engaged with the threaded holes 43, 43. Thus the depressing plate 14 is fixed above the stationary contact plate 12.

Subsequently the screws 30 are threadedly engaged with the nuts 11a embedded at the front and rear sides of the steering wheel W in the depressing horn pad 11 through the threaded holes 21a in the projecting members 21 of the stationary contact plate 21 and through the threaded holes 10c in the base portion 10b of the energy absorber 10. The depressing horn pad 11 thus is fixed to the energy absorber 10.

Figure 9:
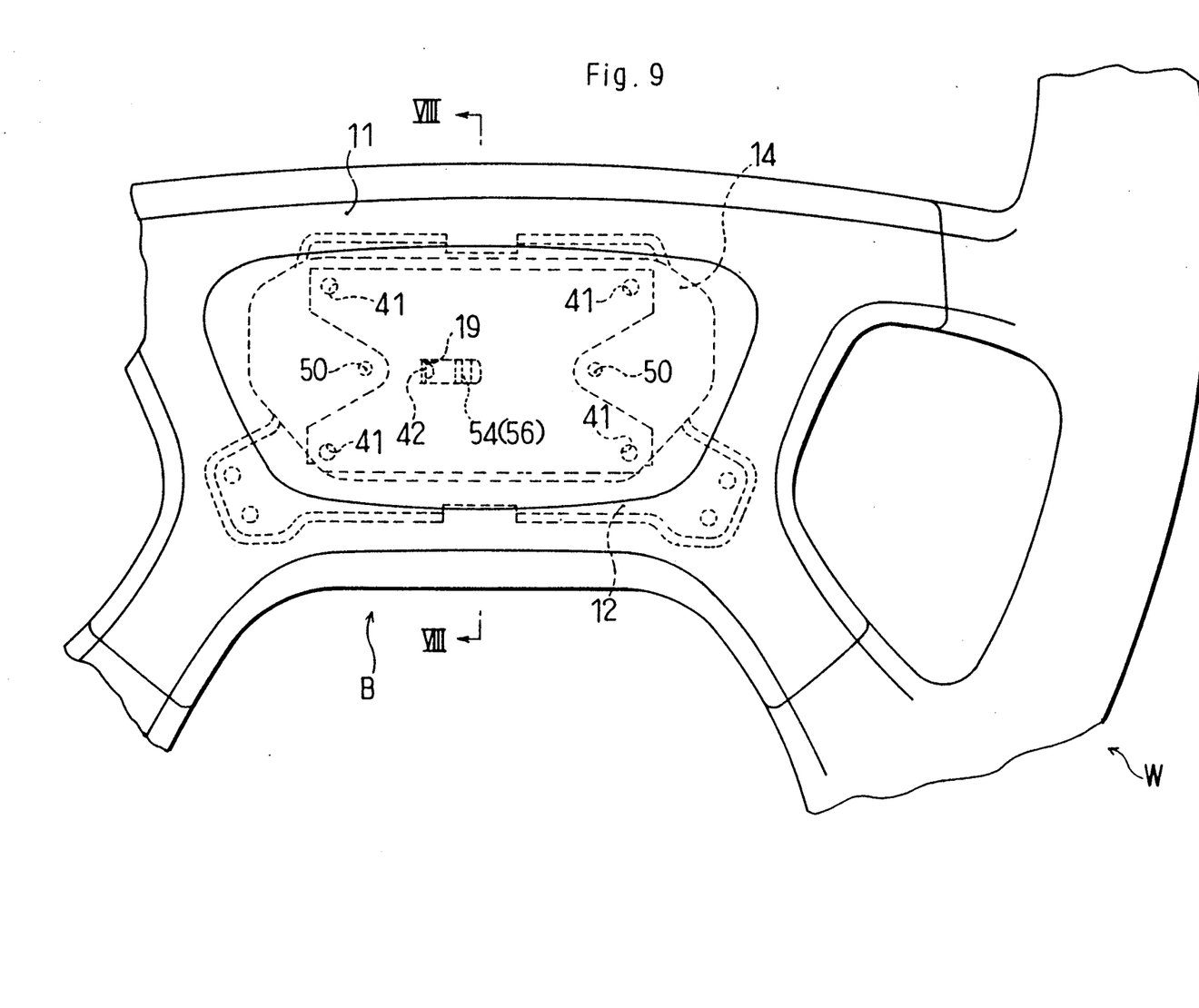
FIG. 9 is a plan view of a steering wheel illustrating an assembled state of the first embodiment.

And then the energy absorber 10 together with the horn switch mechanism H1 is fixed to the steering wheel body where the boss plate 60 or the like in the steering wheel W is arranged (refer to FIG. 9). In the fixing mode, as shown in FIG. 8, the tongue 10d with the nut 10e formed at the base portion 10b of the energy absorber 10 and the locking leg 10f (refer to FIG. 8) locked by the screw 10g (refer to FIG. 7) to the base portion 10b are utilized, and the tongue 10d is fixed to the plate 60a extending upward from the boss plate 60 utilizing the screw 63 and the locking leg 10f is locked to the locking cylinder 62a of the lower cover 62.

The steering wheel W with the horn switch mechanism H1 and the energy absorber 10 assembled thereto is installed to the vehicle, and then the upper side of the depressing horn pad 11 is depressed, thereby the contacts 13c of the contact portions 13b of the movable contact plate 13 are brought into contact with the contacts 12a of the stationary contact plate 12 through the flexible depressing plate 14 so as to operate the horn.

Consequently, in the horn switch mechanism H1 of the first embodiment, during the assembling, the electrical insulation ring 6 in the prior art becomes unnecessary and by utilizing only one electrical insulation spacer 15, the movable contact plate 13 can be assembled to the stationary contact plate 12 and therefore the number of the assembling parts can be decreased.

Further in the first embodiment, the two locking legs 54, 54 are installed in symmetry on both sides of the electrical insulation spacer 15, and engage both side edge portions of the base portion 13a of the movable contact plate 13 by respective engaging members 56 and hold the movable contact plate 13 on the base member 51. Therefore, the movable contact plate 13 can be locked, without rotating, to the electrical insulation spacer 15. The electrical insulation spacer 15 locks the two locking legs 54, 54 to the locking members 24, 26 on the stationary contact plate 12, thereby the electrical insulation spacer 15 itself is also assembled without rotating to the stationary contact plate 12.

The lead wire 8 connected to the movable contact plate 3 in the prior art may be connected to the depressing plate 14, and the connection is performed only in that the terminal 19 with the lead wire 8 connected thereto is fastened by the rivet 17 to the tongue 42 of the depressing plate 14. Consequently, in comparison to the prior art where the four parts, i.e., the movable contact plate 3, the electrical insulation plate 5, the electrical insulation ring 6 and the terminal 9, together are locked by the rivet 7, only two parts, i.e., the tongue 42 and the terminal 19, are locked by the rivet 17. Thus the connecting work can be performed easily.

In the first embodiment, since the projections 52 for positioning both sides of the base portion 13a of the movable contact plate 13 are formed on the upper surface of the base member 51, the positioning during arranging the base portion 13a onto the base member 51 becomes easy. In this connection, the projections 52 need not be installed at the four positions but, for example, two projections 52 may be installed along the major axis direction of the base member 51 nearly at the center line thereof and fitting holes corresponding to these projections may be provided in the base portion 13a of the movable contact plate 13.

Also in the first embodiment, since the rivet 17 used to connect the terminal 19 to the tongue 42 of the depressing plate 14 is different from the rivet 7 for connecting the four parts in the prior art and may be used for connecting two parts only, a small rivet in comparison to the rivet 7 in the prior art may be used and resources saving is realized.

In the first embodiment, in the connection between the depressing plate 14 and the lead wire 8, the terminal 19 is locked by the rivet 17 to the tongue 42. However, the tongue 42 may be clamped directly on the lead wire 8. Further, a fitting portion which can be connected by inserting the terminal 19 may be formed on the end of the tongue 42.

Figure 10:
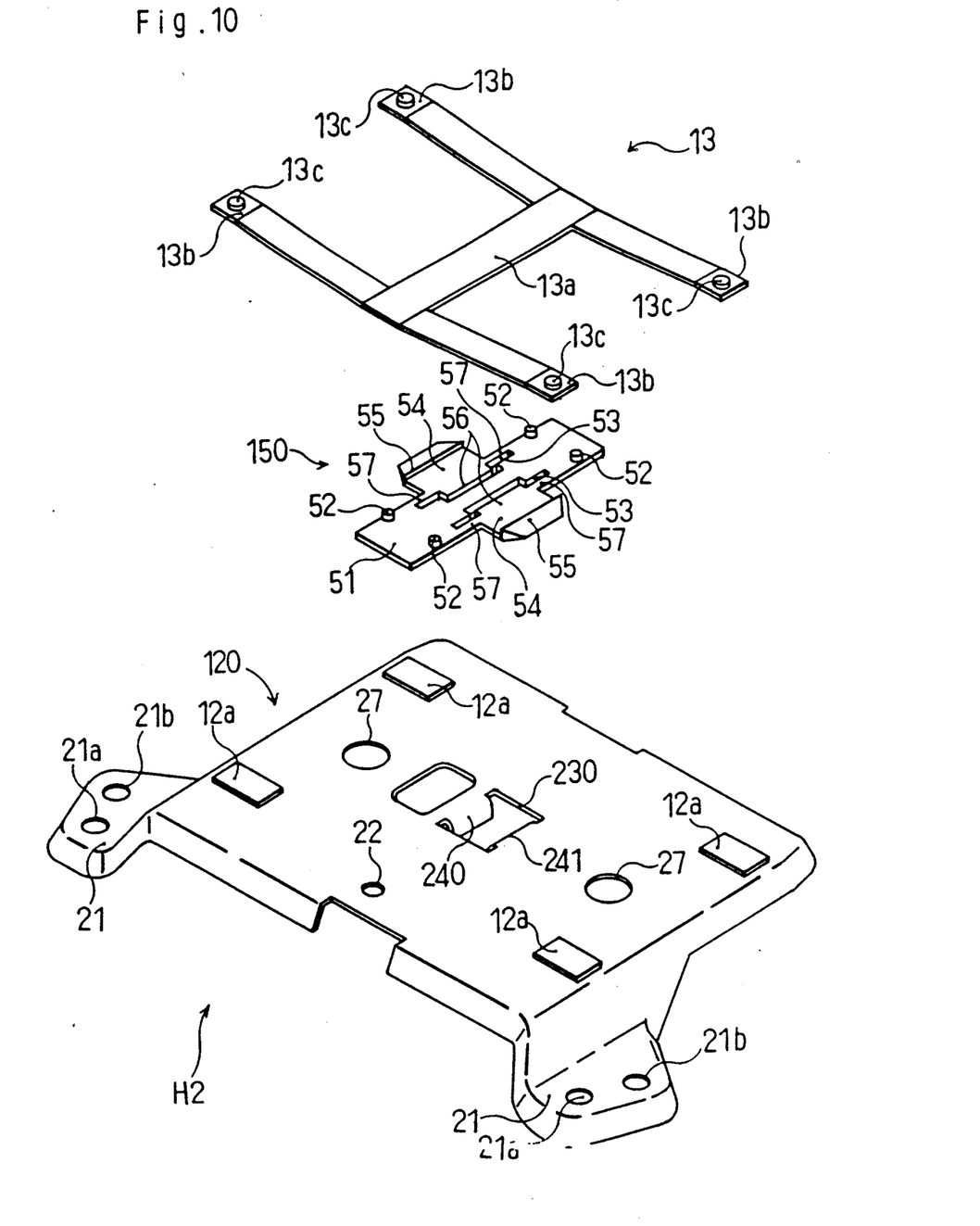
FIG. 10 is an exploded perspective view of the movable contact plate, the electrical insulation spacer and the stationary contact plate of a second embodiment.
Figure 11:
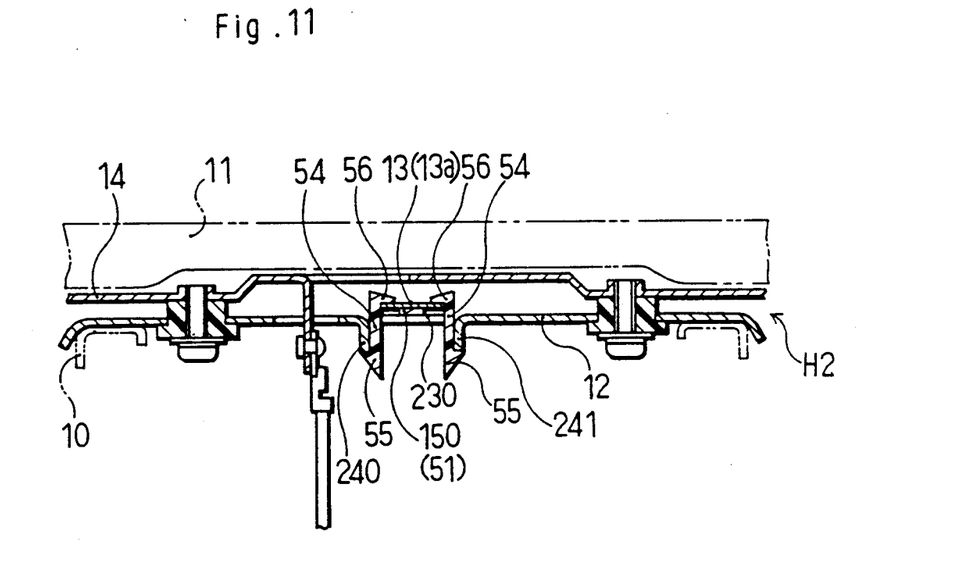
FIG. 11 is a sectional view illustrating the process of assembling the movable contact plate of the second embodiment to the stationary contact plate.

In the first embodiment, the locking legs 54, 54 of the electrical insulation spacer 15 are locked to the peripheral edge of the two locking holes 23, 25 of the stationary contact plate respectively. However, as in a horn switch mechanism H2 of a second embodiment shown in FIGS. 10 and 11, if an electrical insulation spacer 150 is formed so that the hook portions 55 of the locking legs 54, 54 face away from each other when each hook portion 55 is bent downward, only one locking hole 230 is needed in a stationary contact plate 120. Numerals 240, 241 designate locking members formed on opposite peripheral edges of the locking hole 230 for locking the hook portions 55, 55.

In the first and second embodiments, although the movable contact plate 3 is of H shape viewing from the upper side, if the base portion 13a and the contact portions 13b extending from the base portion 13a are provided, a movable contact plate of striplike shape viewing from the upper side may be used.

Further, in the first and second embodiments, both side edge portions of the base portion 13a are locked by the engaging members 56 of the locking legs 54, 54 of the electrical insulation spacers 15, 150. However, as in a horn switch mechanism H3 of a third embodiment shown in FIGS. 12 and 13, the movable contact plate 130 may be made in two separate strips each having two locking holes 130a, 130b. Adjacent edges of the holes 130a, 130b may be made edge portions to be engaged by the engaging members 56 of the locking legs 54, 54 of two electrical insulation spacers 150.

Figure 12:
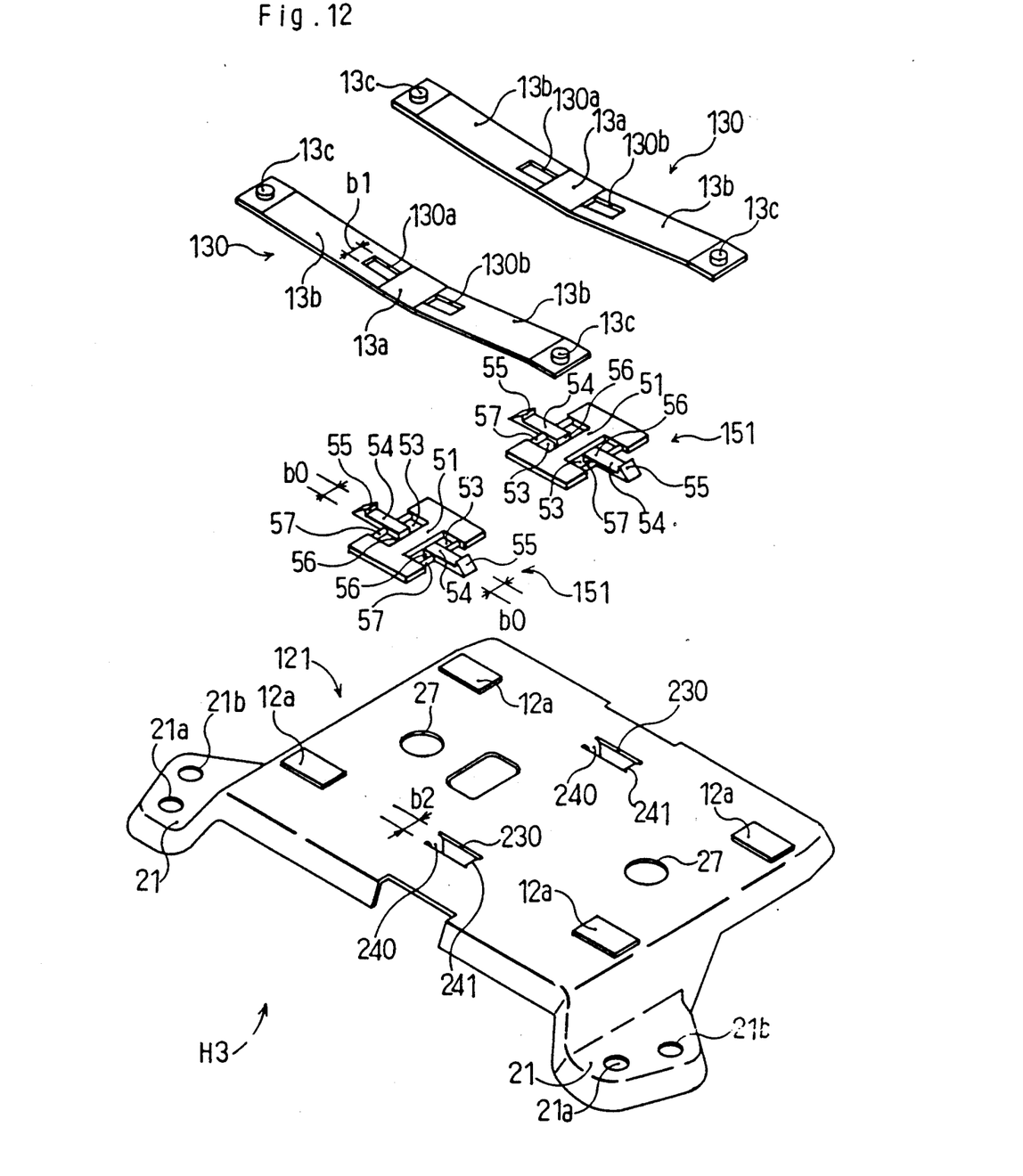
FIG. 12 is an exploded perspective view of the movable contact plate, the electrical insulation spacer and the stationary contact plate of a third embodiment.

The movable contact plate 130 is made of a plate spring similar to the first and second embodiments, and the through holes 130a and 130b are formed nearly at the base 13a of the contact portions 13b which extend upward from the base portion 13a.

Figure 13:
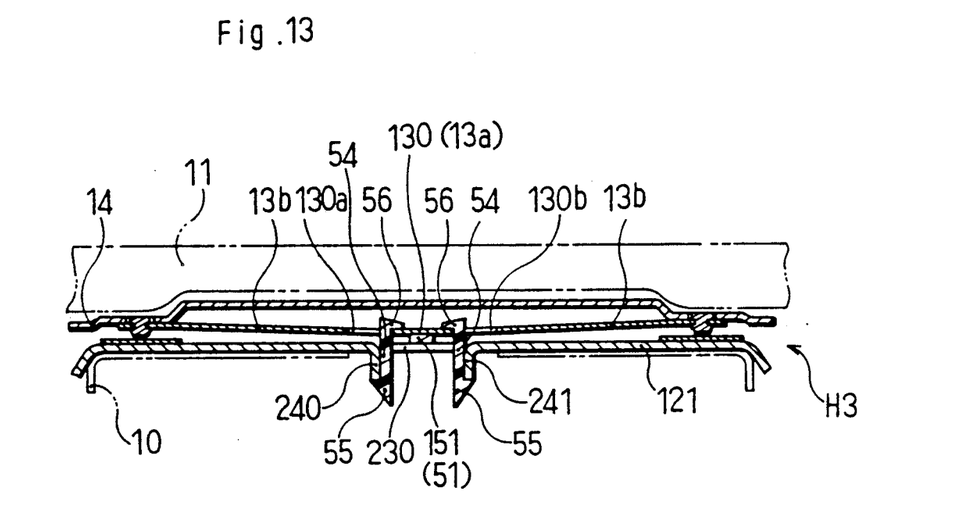
FIG. 13 is a sectional view illustrating the mode of assembling the movable contact plate of the third embodiment to the stationary contact plate.

In the third embodiment, in addition to the effects similar to the first and second embodiments, each of the locking legs 54, 54 of the electrical insulation spacer 151 has width b0 nearly coincident with width b1 of the locking holes 130a, 130b of the movable contact plate 130 and with width b2 of the locking holes 230 in the stationary contact plate 121. consequently, after the movable contact plate 130 is assembled to the stationary contact plate 121 using the electrical insulation spacers 151, the movable contact plate 130 can be prevented from shifting with respect to the stationary contact plate 121 not only in the major axis direction but also in the minor axis direction.

In the third embodiment, although the movable contact plate 130 is of two strip-like shapes viewing from the upper side, of course, if a predetermined hole is provided in the base portion 13a, movable contact plate 13 of H shape viewing from the upper side as used in the first and second embodiments may be used.

What is claimed is:

1. A horn switch mechanism of a steering wheel, comprising:
   (a) a stationary contact plate having locking holes means provided with opposite peripheral edge portions;
   (b) a movable contact plate having a base portion and contact portions extending upward from said base portion, said base portion being fixed to said stationary contact plate;
   (c) depressing horn pad disposed above said movable contact plate;
   (d) an electrical insulation spacer and fastener disposed between said stationary contact plate and said movable contact plate, said spacer comprising a base member mounting at said base portion of said movable contact plate, two locking legs mounted to opposite sides of said base member and means elastically connecting said legs to said base member for turning movement about substantially parallel axes disposed transversely of said legs between the ends thereof, a first corresponding pair of the ends of said legs normally being spaced apart a distance less than that between said sides of said base portion and being adapted to engage with the edge portions of said sides to fasten said movable contact plate on said spacer and a second corresponding pair of the ends of said legs normally being spaced apart a distance greater than that between said edge portions of said locking hole means and being adapted to engage with said hole edge portions to fasten said spacer on said stationary contact plate, whereby said second pair of ends can be moved manually toward each other against the elastic resistance of said connecting means and inserted through said locking hole means and at the same time said first pair of ends will be moved away from each other to receive said base portion therebetween and when said second pair of ends are released said connecting means will move said second pair of ends apart to engage said side edge portions of said locking holes means and move said first pair of ends toward each other to engage said side edge portions of said base portion to thereby fasten said spacer on said stationary contact plate and fasten said movable contact plate on said spacer while electrically insulating said plates from each other.

2. A horn switch mechanism of a steering wheel as set forth in claim 1, wherein said stationary contact plate is provided with two locking holes and each of said two locking legs projects through a respective locking hole.

3. A horn switch mechanism of a steering wheel as set forth in claim 1, wherein said stationary contact plate is provided with one locking hole and both of said two locking legs of said electrical insulation spacer project through said one locking hole.

4. A horn switch mechanism of a steering wheel as set forth in claim 1, including aligning projections on said base member for engaging opposite edges of said base portion to properly position said movable plate on the spacer.

5. A horn switch mechanism of a steering wheel as set forth in claim 1, wherein said movable contact plate is provided with contact portions extending upward from opposite sides of said base portion and with two locking holes extending through said two contact portions on said opposite sides of adjacent said base portion, and the first pair of the ends of the two locking legs project respectively through said two locking holes.

6. A horn switch mechanism of a steering wheel as set forth in claim 5, wherein the width dimension of each locking hole in said movable contact plate is substantially the same as that of the corresponding leg end and the width dimension of said locking hole means in said stationary contact plate is substantially the same as that of the corresponding leg end.

7. A horn switch mechanism of a steering wheel as set forth in claim 1, wherein said movable contact plate is of substantially H shape viewing from the upper side, and the cross-bar portion of said H shape constitutes said base portion and the lateral arm portions of said H shape are the contact portions.

8. A horn switch mechanism of a steering wheel as set forth in claim 1, wherein said movable contact plate is of substantially strip-like shape viewing from the upper side, and the center portion thereof is said base portion and the portions on opposite sides of said base portion are the contact portions.

9. A horn switch mechanism of a steering wheel as set forth in claim 1, further comprising a conductive depressing plate having a depending tongue and disposed on said movable contact plate.

10. A horn switch mechanism of a steering wheel as set forth in claim 9, wherein a lead wire is connected to said tongue.

11. A horn switch mechanism of a steering wheel as set forth in claim 1, wherein said base member of said electrical insulation spacer is provided with two slits substantially in parallel to each other and defining the first pair of ends.

12. A horn switch mechanism of a steering wheel as set forth in claim 1, wherein said spacer is of elastic material and said base member, said two locking legs and said connecting means are integral.

* * * * *